(No Model.)
E. A. TERHUNE.
HEDGE FENCE.
No. 524,032. Patented Aug. 7, 1894.
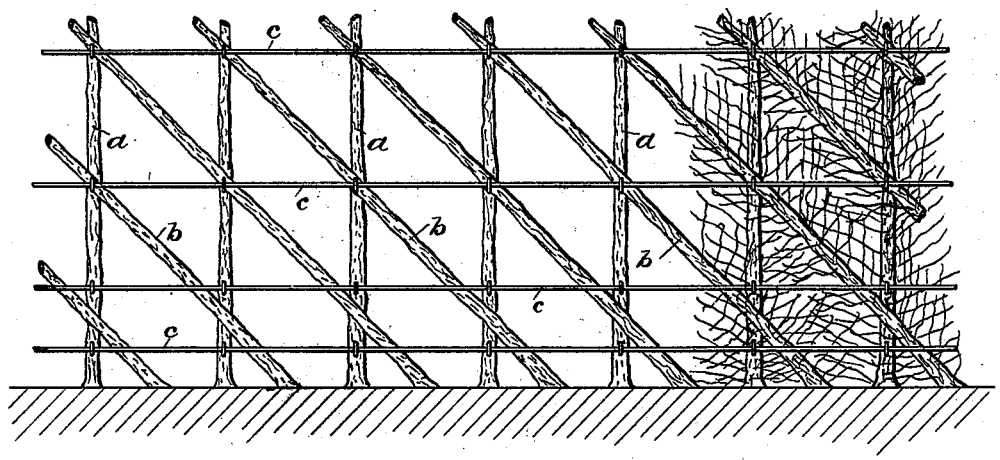
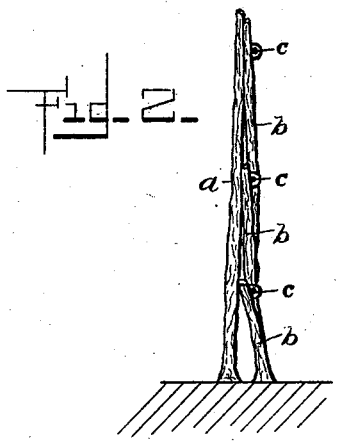
Witnesses:
Geo. P. Norris
N. L. Collamer
Inventor.
Eugene A. Terhune,
By A. M. Smith & Son,
Attorneys.

UNITED STATES PATENT OFFICE.

EUGENE ATWOOD TERHUNE, OF HARRODSBURG, KENTUCKY, ASSIGNOR OF FOUR-FIFTHS TO SAMUEL FORSYTH, JOHN H. VANDIVIER, WILLIAM T. EWING, AND J. M. DALTON, OF SAME PLACE.

HEDGE FENCE.

SPECIFICATION forming part of Letters Patent No. 524,032, dated August 7, 1894.

Application filed April 9, 1894. Serial No. 506,908. (No model.)

*To all whom it may concern:*

Be it known that I, EUGENE ATWOOD TERHUNE, a citizen of the United States, and a resident of Harrodsburg, county of Mercer, and State of Kentucky, have invented a new and useful Improvement in Hedge Fences, of which the following is a full, clear, and exact description, reference being had to the accompanying drawings, making part of this specification.

My invention has for its object to secure a strong, substantial and dense or impenetrable hedge fence and at the same time one that shall be ornamental in appearance, simple in arrangement and cheap in construction. It will be understood from the following description and claims, reference being had to the accompanying drawings, in which—

Figure 1 represents a section of hedge fence embracing my improvement, and with the branches of the plants removed, in part, to show the arrangement of the plants, and Fig. 2 shows an edge or end view of the same.

In setting out the hedge plants, I arrange them, preferably, in two rows, with the plants of one row set midway, intermediate those of the other row, so that if the plants of each row are, say about eight inches apart, which is a suitable distance, those of the one row being intermediate and in a line in close proximity to those of the other row, the plants of the two rows will be only about four inches apart. Thus set out, the plants are allowed to grow until well set and large enough to plash down, after which the plants a, of one row are left standing, erect, and those b, of the other row are plashed down to an angle of, say forty-five degrees, more or less, to cross the plants of the row left standing, as indicated in the drawings. Four wires c, c, are employed, running longitudinally of the fence, one near the bottom, one near the top or desired height of the hedge, and two intermediate, as shown. Each plant is fastened to the wires with staples, and this serves to hold them securely in the desired position, preventing those bent down from drawing the others out of their upright position. By this arrangement, all disturbance of the roots of the upright plants is avoided and their growth is not retarded. The plants that are plashed or bent down, may have the roots, on the side from which they are to be deflected, partly cut, in the usual manner, to facilitate their being deflected, as described, but as the plashing or bending down of the alternate plants is to be done while the plants are yet young and easily bent, the cutting of the roots and the consequent retarding of the growth of the plants, resulting therefrom, can be avoided.

By the arrangement of the plants and the wires, as described, a strong and vigorous growth of plants, under the ordinary culture, is insured, each plant is held in the desired position without in any way interfering with the other plants, and the branches of the upright plants, becoming interlaced with those of the inclined plants, a strong, ornamental and practically impenetrable hedge fence speedily results.

Having thus described my invention, what I claim as new, and desire to secure by Letters Patent, is—

1. In a hedge fence, the combination with the vertical or upright plants, of the alternate plants set out of line with the upright plants and plashed down at an angle to cross two or more upright plants, and secured to wires in said inclined position substantially as described.

2. In a hedge fence, the plants set alternately in two parallel rows, those of one row being left in upright position, those of the other alternating with the upright plants and being plashed down at an angle thereto in combination with the wires to which said plants are secured, substantially as described.

3. In a hedge fence, the combination of the plants set upright, the alternating plants plashed down at an angle to said upright plants and the longitudinally arranged wires to which the plants are secured, all substantially as described.

In testimony whereof I have hereunto set my hand this 6th day of April, A. D. 1894.

EUGENE ATWOOD TERHUNE.

Witnesses:
F. M. SHUMATE,
S. E. SIMS.